United States Patent [19]

Mueller et al.

[11] 4,445,193
[45] Apr. 24, 1984

[54] BISYNCHRONOUS HOST/TERMINAL COMMUNICATION SYSTEM WITH NON-CLOCK-GENERATING MODEM & PLL GENERATED CLOCK SIGNAL

[75] Inventors: Mark W. Mueller; Thomas S. Parker, both of Cedar Park, Tex.

[73] Assignee: International Business Machines Corporation, Armonk, N.Y.

[21] Appl. No.: 274,296

[22] Filed: Jun. 16, 1981

[51] Int. Cl.³ .......................... G06F 3/04; G06F 3/00
[52] U.S. Cl. ................................. 364/900; 370/85; 340/825.5
[58] Field of Search ... 364/200 MS File, 900 MS File; 370/85; 358/322, 323, 326, 329; 340/825.5

[56] References Cited

U.S. PATENT DOCUMENTS

| | | | |
|---|---|---|---|
| 3,430,204 | 2/1969 | Milford | 364/900 |
| 3,889,064 | 6/1975 | Fletcher | 179/15 BS |
| 4,065,862 | 1/1978 | Meyer | 364/200 |
| 4,227,178 | 10/1980 | Gergaud et al. | 340/147 R |
| 4,247,908 | 1/1981 | Lockhart, Jr. et al. | 364/900 |
| 4,249,266 | 2/1981 | Nakamori | 455/608 |
| 4,270,150 | 5/1981 | Diermann et al. | 360/10 |
| 4,281,380 | 7/1981 | De Mesa | 364/200 |
| 4,358,825 | 11/1982 | Kyu et al. | 364/200 |

OTHER PUBLICATIONS

D. M. Nagel, Asynchronous Receiver with Character Insert, IBM Technical Disclosure Bulletin, vol. 19, No. 8 (Jan. 1977).

*Primary Examiner*—James D. Thomas
*Assistant Examiner*—Archie E. Williams, Jr.
*Attorney, Agent, or Firm*—Harold E. Meier

[57] ABSTRACT

A communication adapter circuit (10) is connected to a processor through processor I/O interface buses (12, 14). Data and control signals are provided through the buses (12, 14) to a timer circuit (18), a programmable peripheral interface circuit (20), an asynchronous and bisynchronous control circuit (22) and an SDLC/HDLC control circuit (24). Each of the control circuits (22, 24) includes parallel-to-serial and serial-to-parallel conversion circuitry. A clock select circuit (32) operates in conjunction with the timer circuit (18) and the programmable peripheral interface circuit (20) to establish a data transmission rate for the data flow through the adapter circuit (10). From the control circuits (22, 24) the data is transmitted through a modem interface bus (44) to a dual modem switch (56). From the switch (56) the data is transmitted to either an EIA RS 232 interface circuit (60) to a conventional modem or through a bus (64) to an internal modem. A phase locked loop (PLL) circuit in the control circuit (24) generates a data clock signal on a line (33) for operation of the adapter circuit (10) in the bisynchronous protocol with a non-clock-generating modem.

6 Claims, 17 Drawing Figures

BISYNCHRONOUS HOST/TERMINAL COMMUNICATION SYSTEM WITH NON-CLOCK-GENERATING MODEM & PLL GENERATED CLOCK SIGNAL

DESCRIPTION

RELATED APPLICATION

Copending application entitled "Communication Adapter Circuit", filed June 16, 1981, Ser. No. 274,300 to Mueller et al is directed to subject matter related to this application.

BACKGROUND OF THE INVENTION

1. Field of the Invention

The present invention pertains to data communications and in particular to a communication interface for processing bisynchronous protocol communications.

2. Description of Prior Art

Digital data communication between remote terminals is coming into widespread use especially for office and business communications. This communication is typically transmitted through telephone lines or equivalent narrow band communication channels. Each of the terminals involved in the communication usually utilizes a modem for transmission of the digital data over the communication channel. However, in the development of data communications a number of separate and incompatible communication protocols have been adopted. A terminal which is designed to operate with one protocol is limited to communicating only with other terminals which utilize the same protocol. The existence of the multiple and incompatible protocols constitutes a serious impediment to the expansion of business and commercial data communications.

Bisynchronous protocol is frequently used in business and commercial communications. The standard circuit designed for use with this protocol does not include clock generation circuitry but depends upon a clock signal which is derived from the modem. The bisynchronous protocol has traditionally been associated only with self clocked medium speed modem operations, but there are requirements for bisynchronous protocol communication using non-clocked modems. Therefore, there exists a need for a bisynchronous protocol communication circuit which can operate with a non-clock-generating modem.

SUMMARY OF THE INVENTION

A selected embodiment of the present invention comprises a bisynchronous protocol communication circuit for use in conjunction with a non-clock-generating modem to provide data transfer between a processor and a remote terminal. The communication circuit includes circuitry for generating a clock signal and a digital phase locked loop circuit which is connected to receive a serial data stream from the modem and is further connected to receive the clock signal. The digital phase locked loop circuit generates a data clock signal which is phase locked with the serial data stream from the modem. The communication circuit further includes a bisynchronous communication control circuit connected for parallel data transfer with the processor, connected to receive the serial data stream from the modem and connected to receive the data clock signal. The bisynchronous communication control circuit provides data transfer between the processor and the remote terminal through the non-clock-generating modem while using the bisynchronous protocol.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
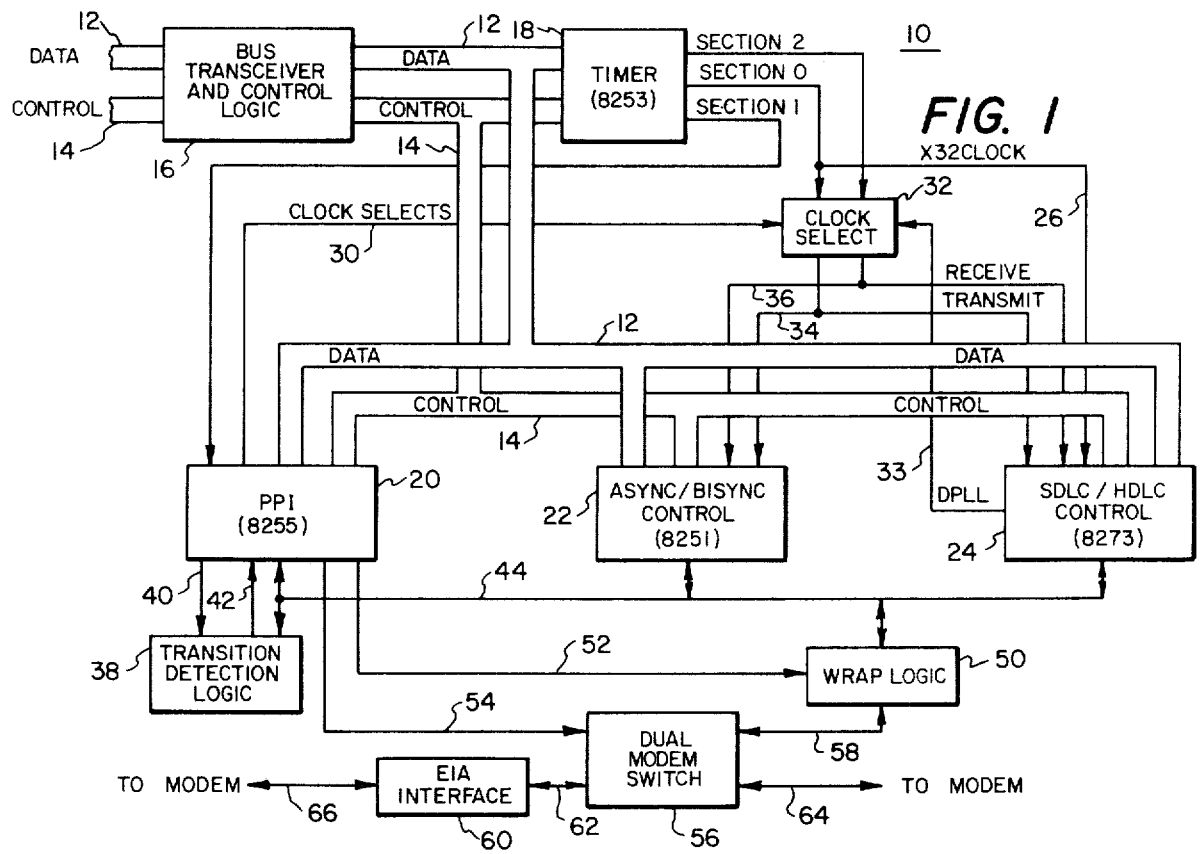
FIG. 1 is a functional block diagram of a communication adapter circuit which includes the present invention.

Referring now to FIG. 1 a multi-protocol communication adapter circuit 10 is shown as a functional block diagram. A work station, such as a word processing unit, includes a processor that carries out the function of the work station. The adapter circuit 10 is designed to interface with the processor (not shown) such that the word processing work station can be used for direct communications with a remote terminal, such as another word processing work station.

The processor in the work station is connected to buses 12 and 14 which comprise a processor I/O interface. Bus 12 is primarily for data and bus 14 is primary for control. The buses will be referred to as a processor I/O interface. These buses comprise a plurality of lines which transfer command signals and other signals between the various units of the adapter circuit 10 and the processor in the work station.

A bus transceiver and control logic circuit 16 is connected to the processor I/O interface buses 12 and 14. The logic circuit 16 serves to properly route and control the signals transmitted through the buses.

The processor I/O interface buses 12 and 14 are connected to a plurality of functional circuits including a timer circuit 18, a programmable peripheral interface (PPI) circuit 20, an asychronous and bisynchronous control circuit 22 and an SDLC/HDLC control circuit 24. The timer circuit 18 is preferably a type 8253, the PPI circuit 20 is a type 8255, the asynchronous and bisynchronous control circuit 22 is a type 8251 and the SDLC/HDLC control circuit 24 is a type 8273. Each of these four types of LSI circuits is manufactured by Intel Corporation.

The PPI circuit 20 generates clock select command signals which are transmitted through line 30 to a clock select circuit 32. Line 30 in the illustrated embodiment comprises two discrete lines.

A clock signal at a rate which is a multiple of the data transfer rate is transmitted through a line 26 from the timer circuit 18 to the control circuit 24. The control circuit 24 includes a digital phase locked loop which receives the clock signal from line 26 and generates a data clock signal which is transmitted through a line 33 to the clock select circuit 32.

The timer circuit 18 has three internal sections. Sections 0 and 2 are connected to the clock select circuit 32. Section 1 is connected to the PPI circuit 20.

The clock select circuit 32 carries transmit and receive clock signals respectively on lines 34 and 36. These transmit and receive clock signals are input to both the asychronous and bisynchronous control circuit 22 and the SDLC control circuit 24.

A transition detector logic circuit 38 is connected through lines 40 and 42 to the PPI circuit 20. Circuit 38 serves to detect state transitions for the signals and commands transmitted through the adapter circuit 10 over a modem interface bus 44.

The bus 44 is connected to the PPI circuit 20, the asynchronous and bisynchronous control circuit 22, the SDLC control circuit 24 and the transition detector logic circuit 38. The data transfer between the processor and the remote terminal is transmitted in parallel fashion through the processor I/O interface bus 12 and in serial fashion through the bus 44.

A wrap logic circuit 50 is also connected to the bus 44. The PPI circuit 20 provides a command signal through a line 52 to the wrap logic circuit 50. The PPI circuit 20 further provides a command signal through a line 54 to a dual modem switch 56. The wrap logic circuit 50 is connected through a modem interface bus 58 to the switch 56.

An EIA (Electronic Industry Association) RS 232 interface circuit 60 is connected through a bus 62 to the switch 56. A bus 64 is connected between a modem (not shown) and the modem switch 56. A bus 66 is connected between a modem (not shown) and an EIA interface circuit 60.

A detailed schematic diagram of the communication adapter circuit 10 is shown in the FIGS. 2-16. Each of the terminals shown in the FIGS. 2-16 is given a specific designation. The terminals having the same designations are connected in common to form the complete circuit. The terminals shown with terminal pads, such as pad 72 shown in FIG. 2, form connectors on the circuit card which carries the communication adapter circuit 10.

Figure 2:
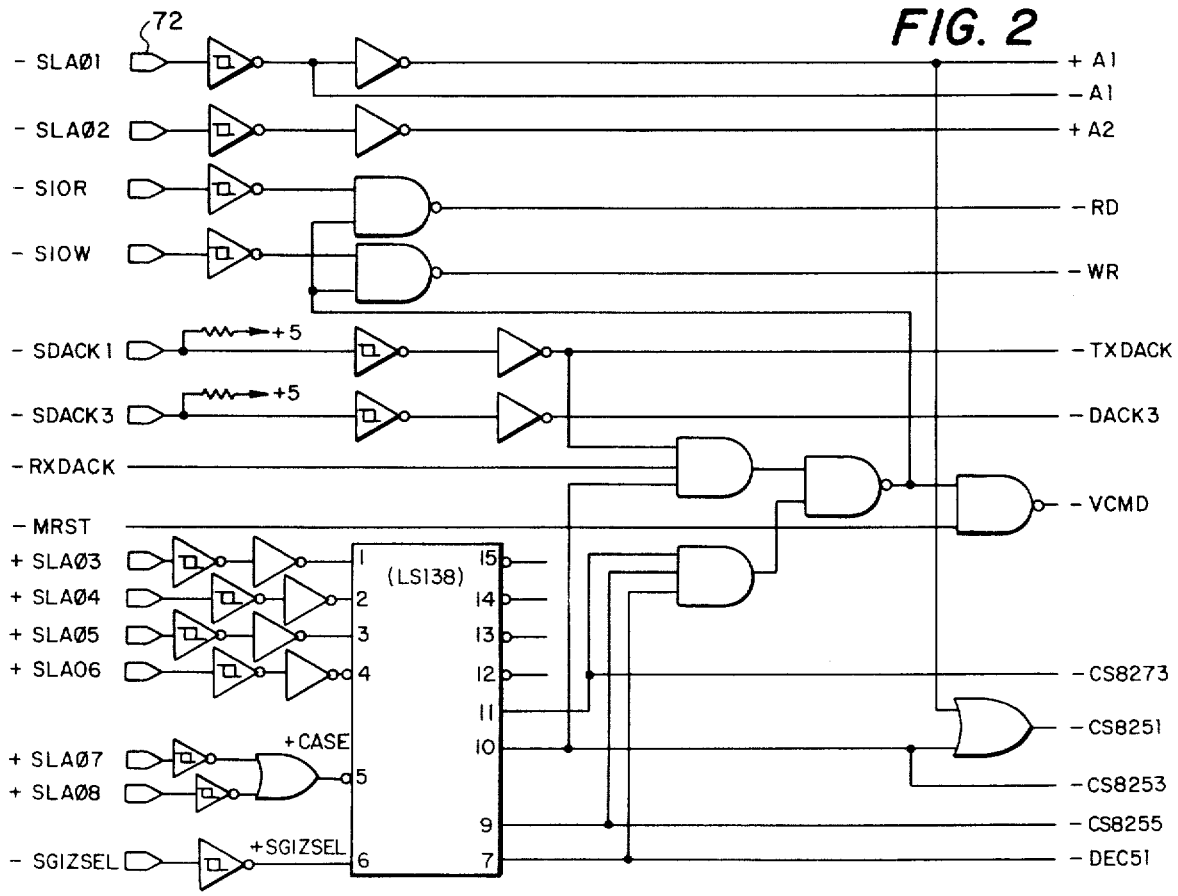
FIGS. 2, 3 and 4 are detailed schematic logic diagrams of the bus transceiver and control logic circuit 16 shown in FIG. 1.
Figure 3:
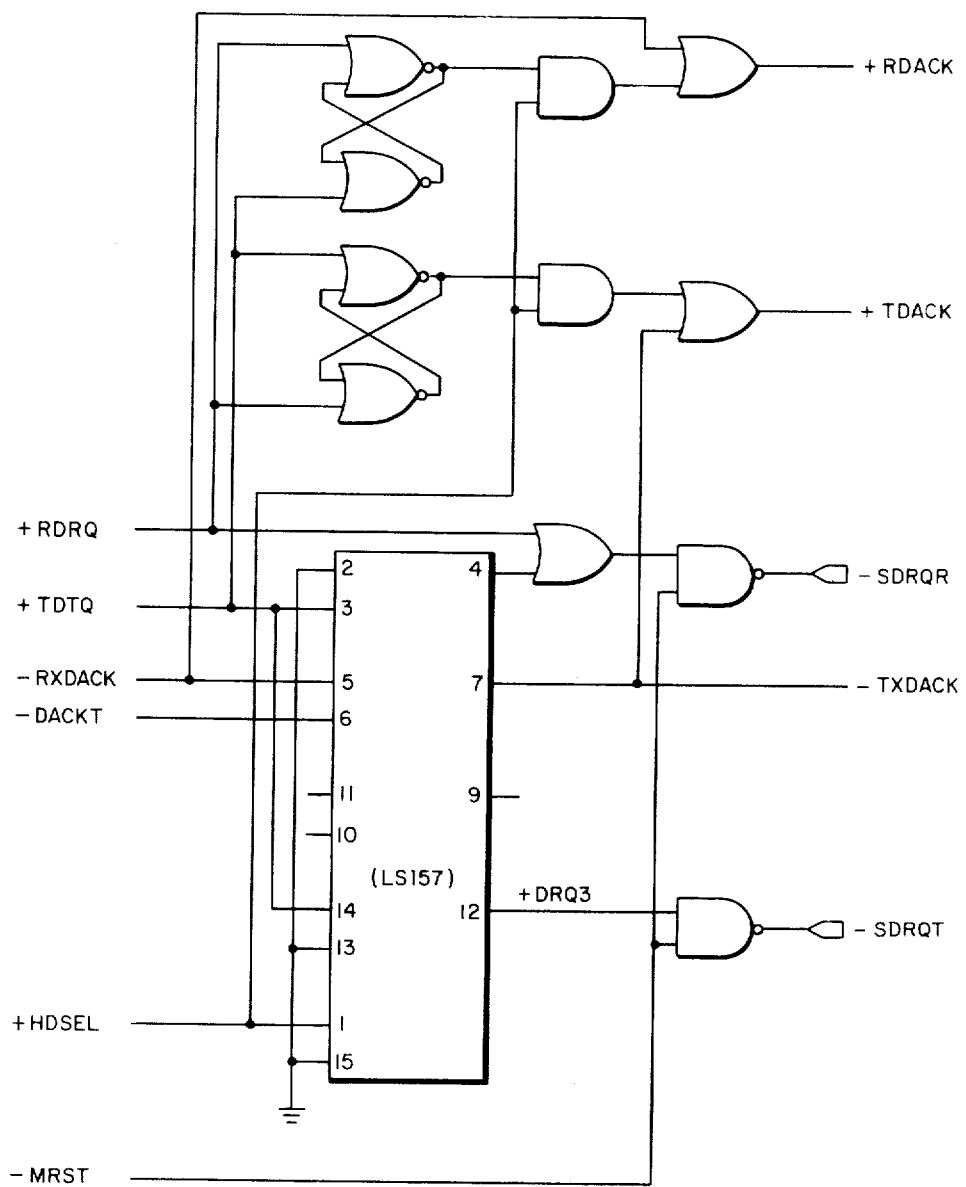
Figure 4:
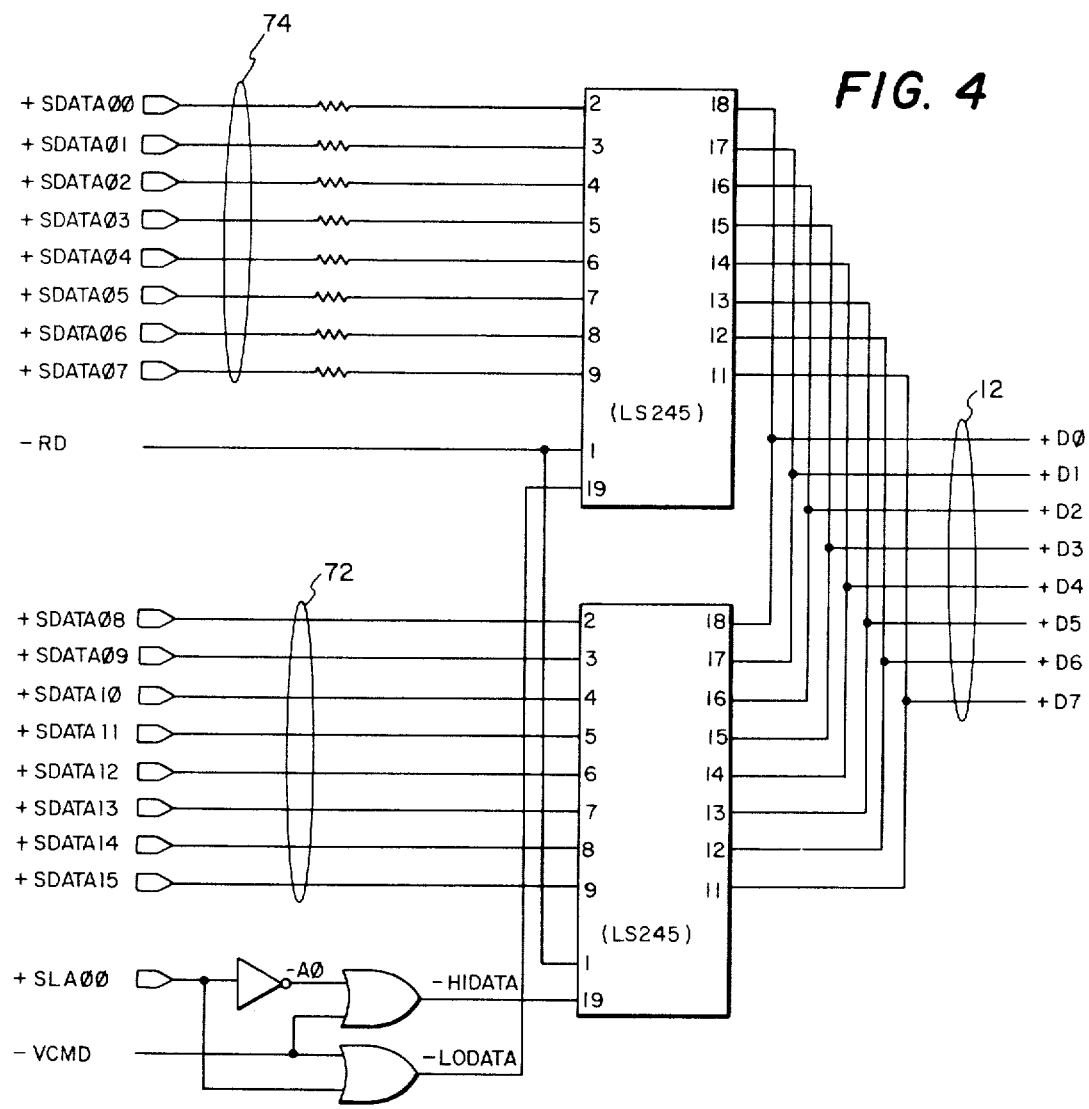

The bus transceiver and control logic circuit 16 is shown in detail in FIGS. 2, 3 and 4. In FIGS. 2 and 4 the connector terminals which have the initial letter "S" are connections to the processor of the work station. Referring specifically to FIG. 4 the lines 74 and 76 are input data lines from the processor (not shown). The lines 74 and 76 comprise a 16 bit wide portion of the data bus 12. The remainder of the data bus 12 in circuit 10 is 8 bits wide and comprises the lines D0 through D7.

Figure 5:
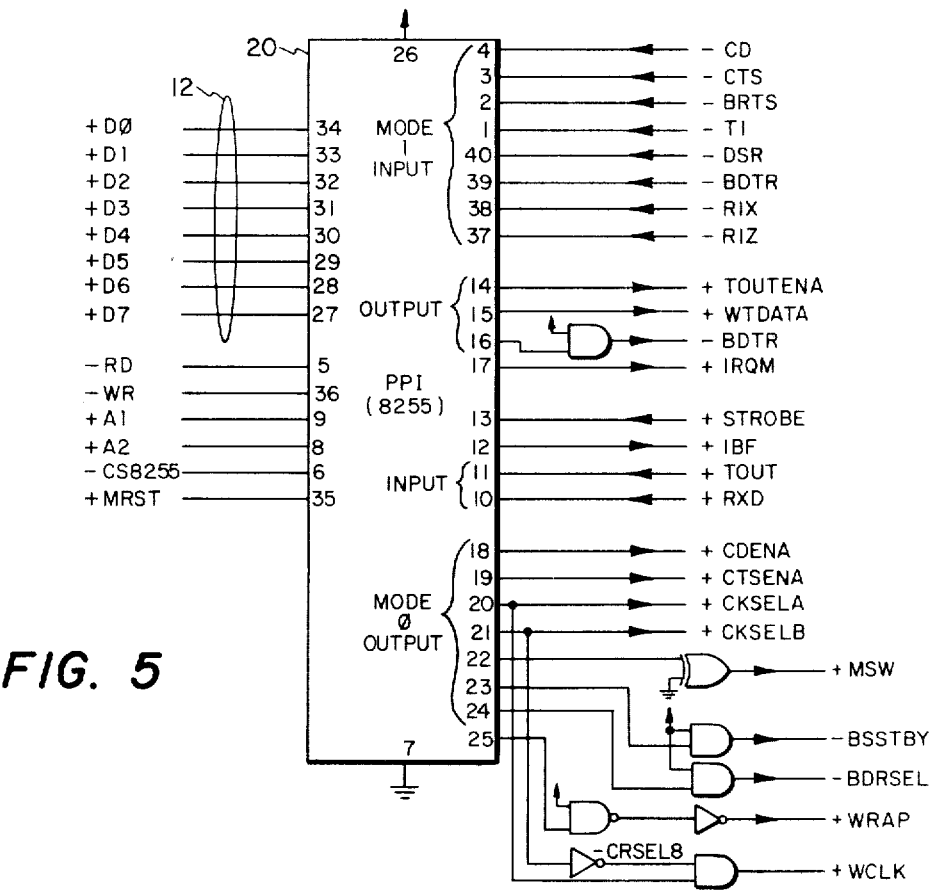
FIG. 5 is a detailed diagram of the programmable peripheral interface circuit (8255) shown in FIG. 1.

FIG. 5 illustrates the detailed pin connections for the PPI circuit 20.

Figure 6:
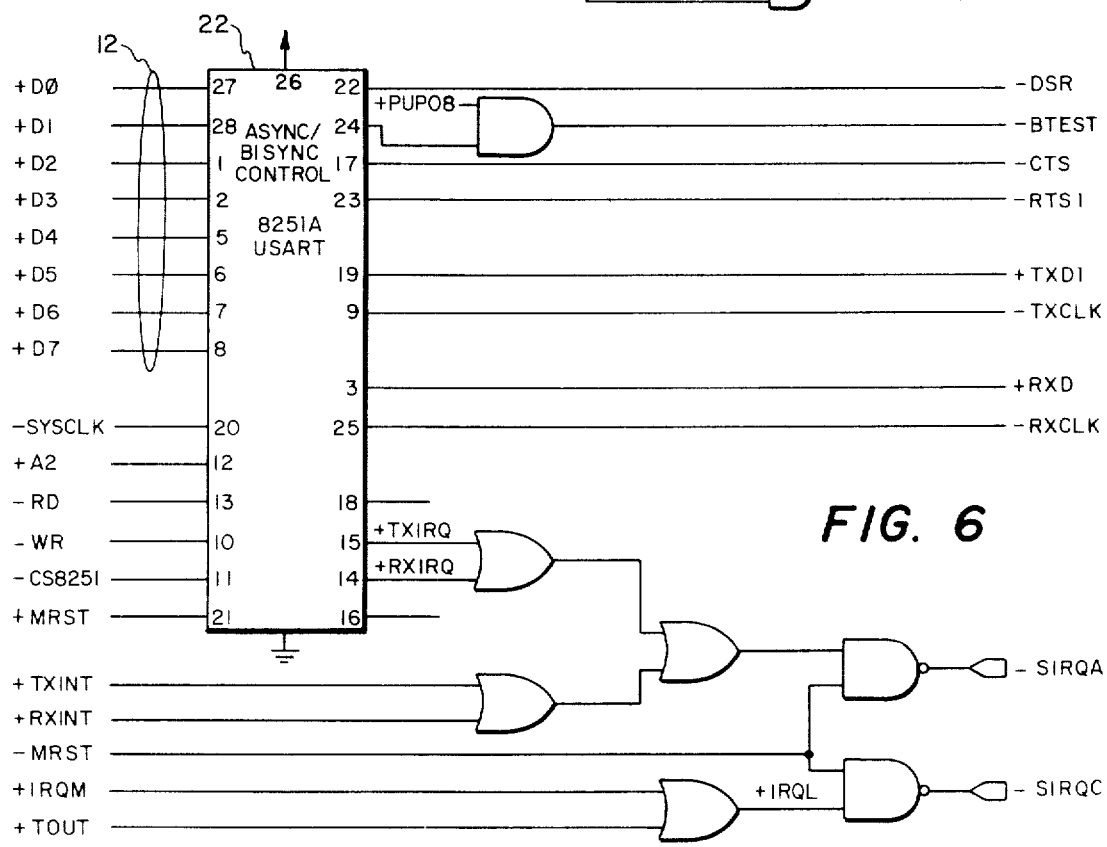
FIG. 6 is a detailed diagram of the asynchronous and the bisynchronous control circuit (8251) shown in FIG. 1.

FIG. 6 shows the detailed pin connections and associated logic for the asynchronous and bisynchronous control circuit 22. Control circuit 22 is further referred to as a USART (Universal Synchronous Asynchronous Receiver Transmitter).

Figure 7:
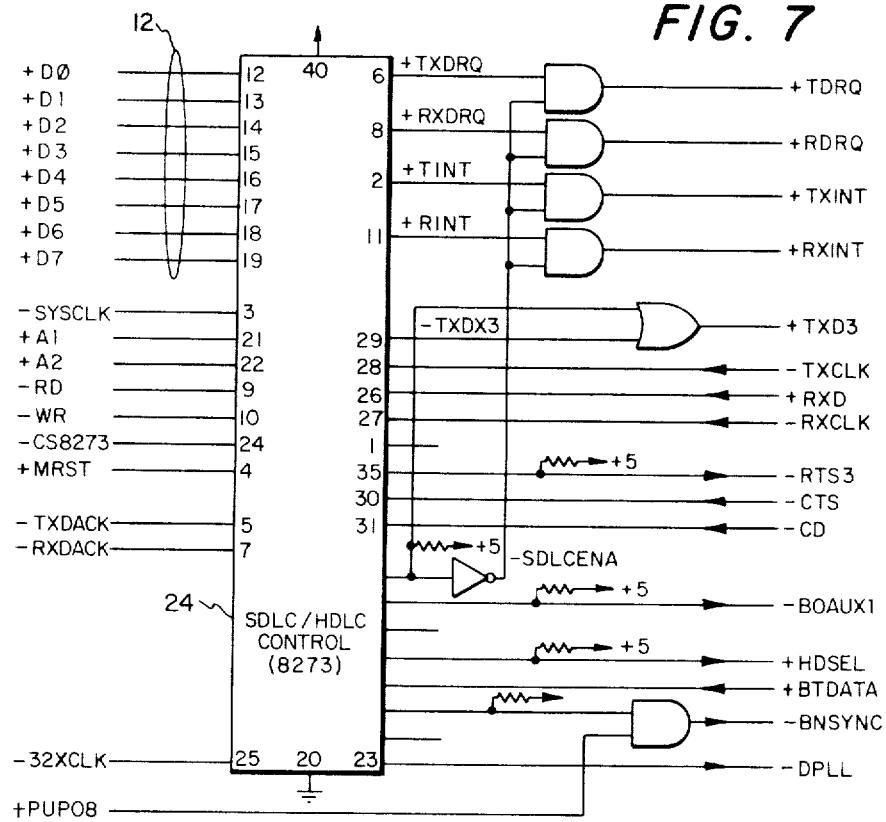
FIG. 7 is a detailed diagram of the SDLC control circuit (8273) shown in FIG. 1.

FIG. 7 is a detailed presentation of the pin connections and associated logic for the SDLC/HDLC control circuit 24.

Figure 8:
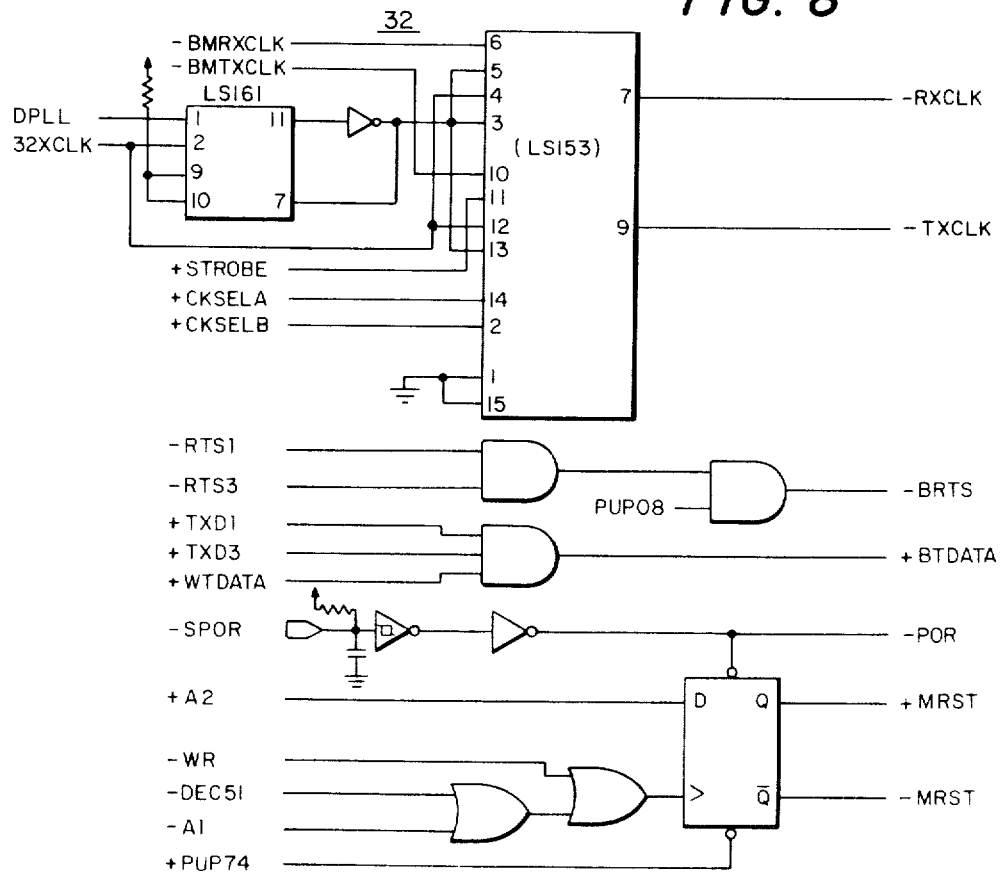
FIG. 8 is a detailed schematic diagram of the clock select circuit 32 shown in FIG. 1.

FIG. 8 is a detailed schematic illustration of the clock select logic circuit 32 shown in FIG. 1.

Figure 9:
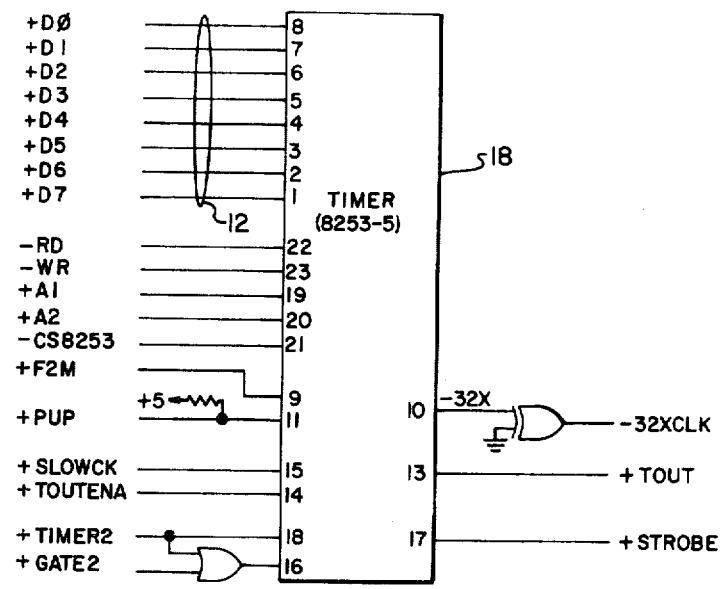
FIG. 9 is a detailed diagram of the timer circuit (8253) shown in FIG. 1.

FIG. 9 is a detailed pin connection illustration for the timer circuit 18 shown in FIG. 1.

Figure 10:
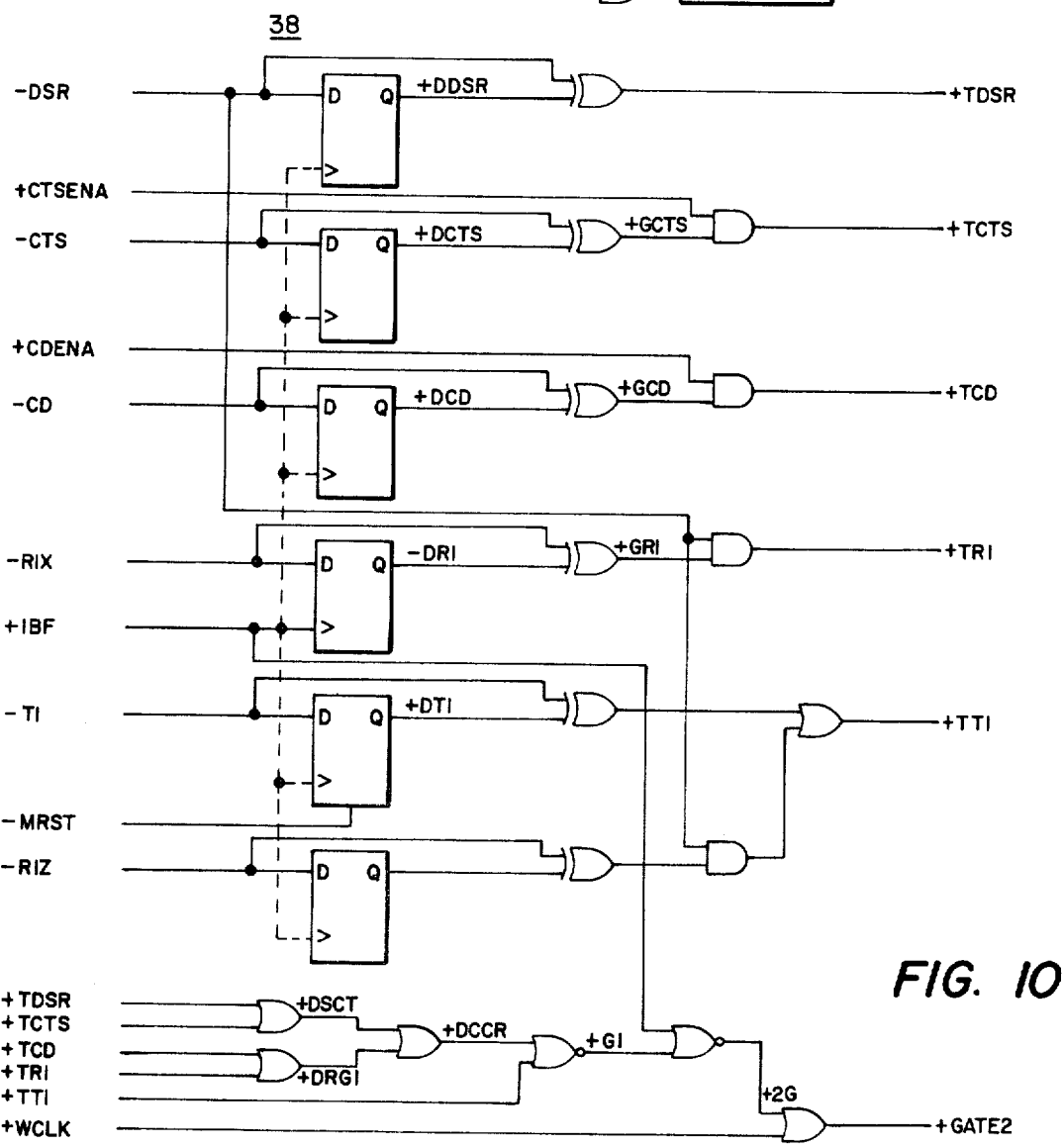
FIG. 10 is a detailed schematic diagram of the transition detector logic circuit 38 shown in FIG. 1.

The transition detector logic circuit 38 is illustrated in the detailed logic diagram in FIG. 10.

Figure 11:
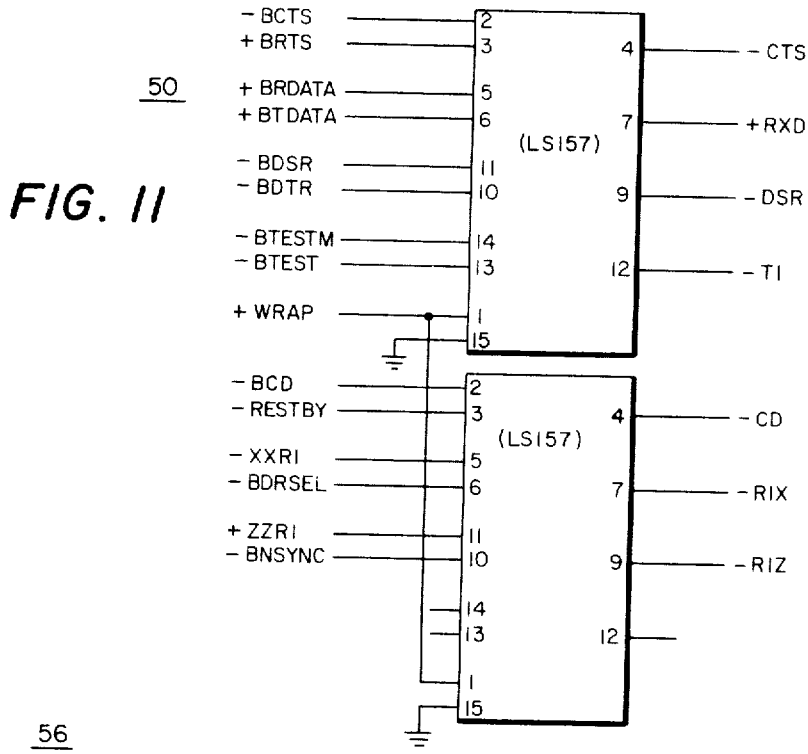
FIG. 11 is a schematic diagram of the wrap logic circuit 50 shown in FIG. 1.

The wrap logic circuit 50 shown in FIG. 1 is illustrated in a detailed schematic in FIG. 11.

Figure 12:
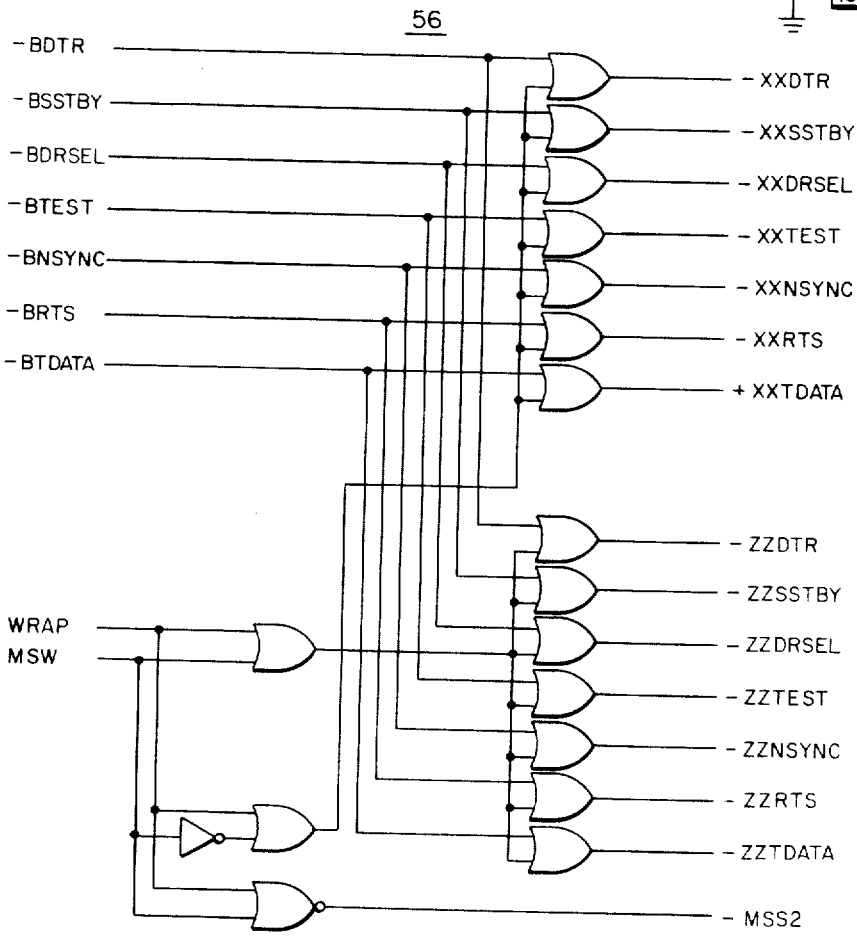
FIGS. 12 and 13 are schematic diagrams of the dual modem switch 56 shown in FIG. 1.
Figure 13:
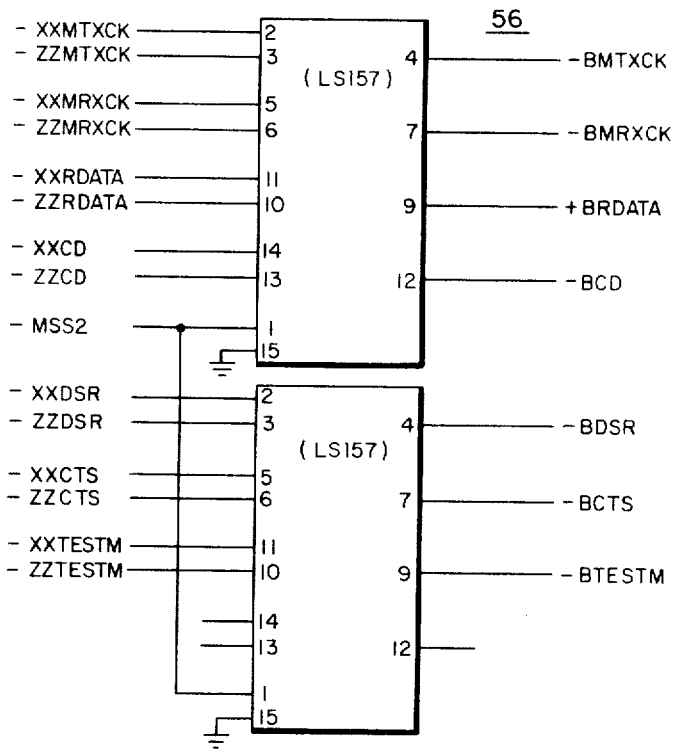

The dual modem switch 56 is shown as a detailed schematic illustration in FIGS. 12 and 13.

Figure 14:
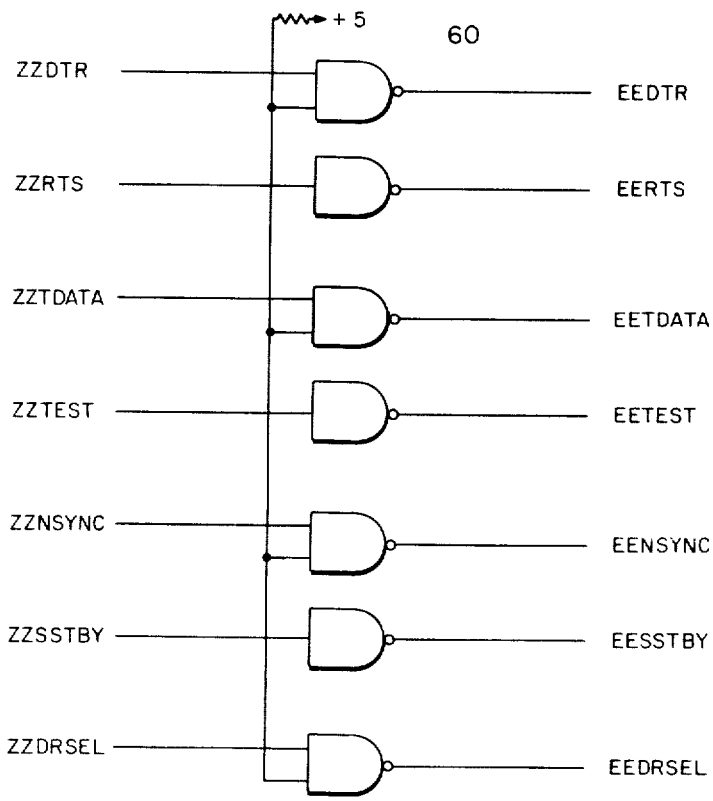
FIGS. 14 and 15 are schematic diagrams of the EIA interface 60 shown in FIG. 1.
Figure 15:
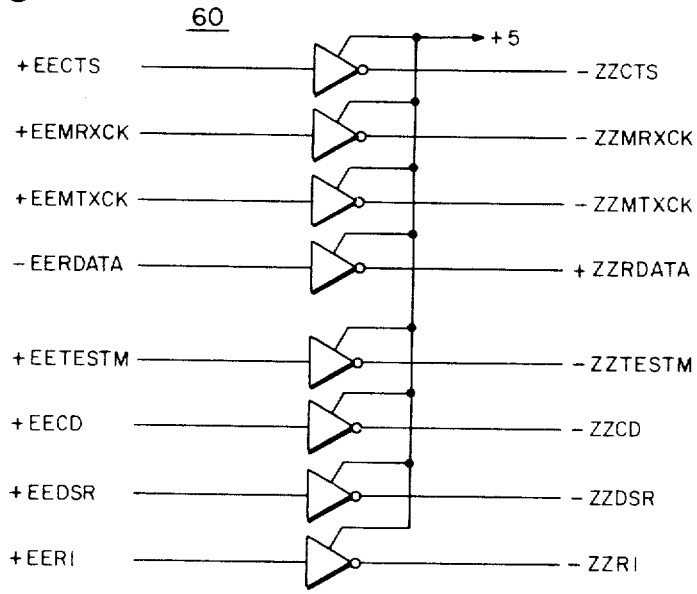
Figure 16:
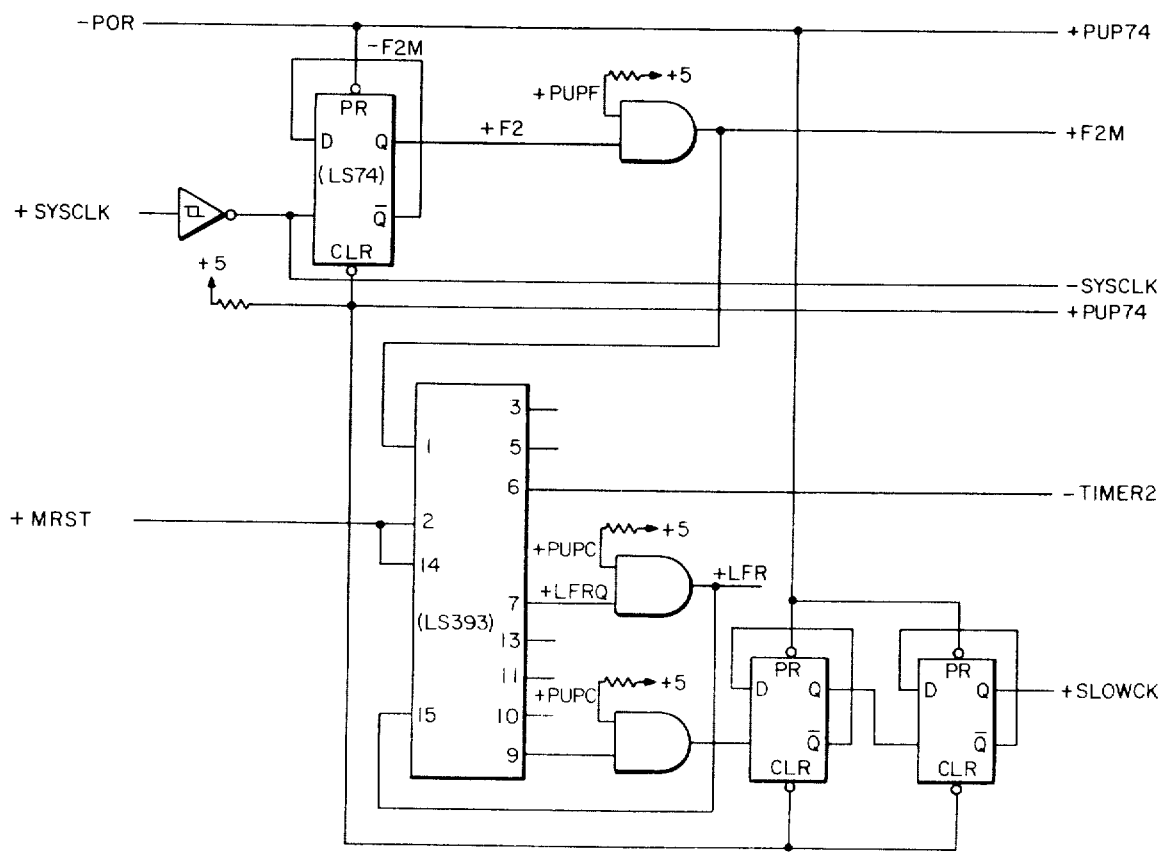
FIG. 16 is a schematic logic diagram of general timing circuitry utilized in the circuit of FIG. 1.

The EIA interface circuit 60 is shown in a detailed schematic illustration in FIGS. 14 and 15.

The adapter circuit 10 requires selected timing signals between varius components of the circuit. These timing signals are generated by a timing circuit 80 which is shown in detailed schematic form in FIG. 16.

Figure 17:
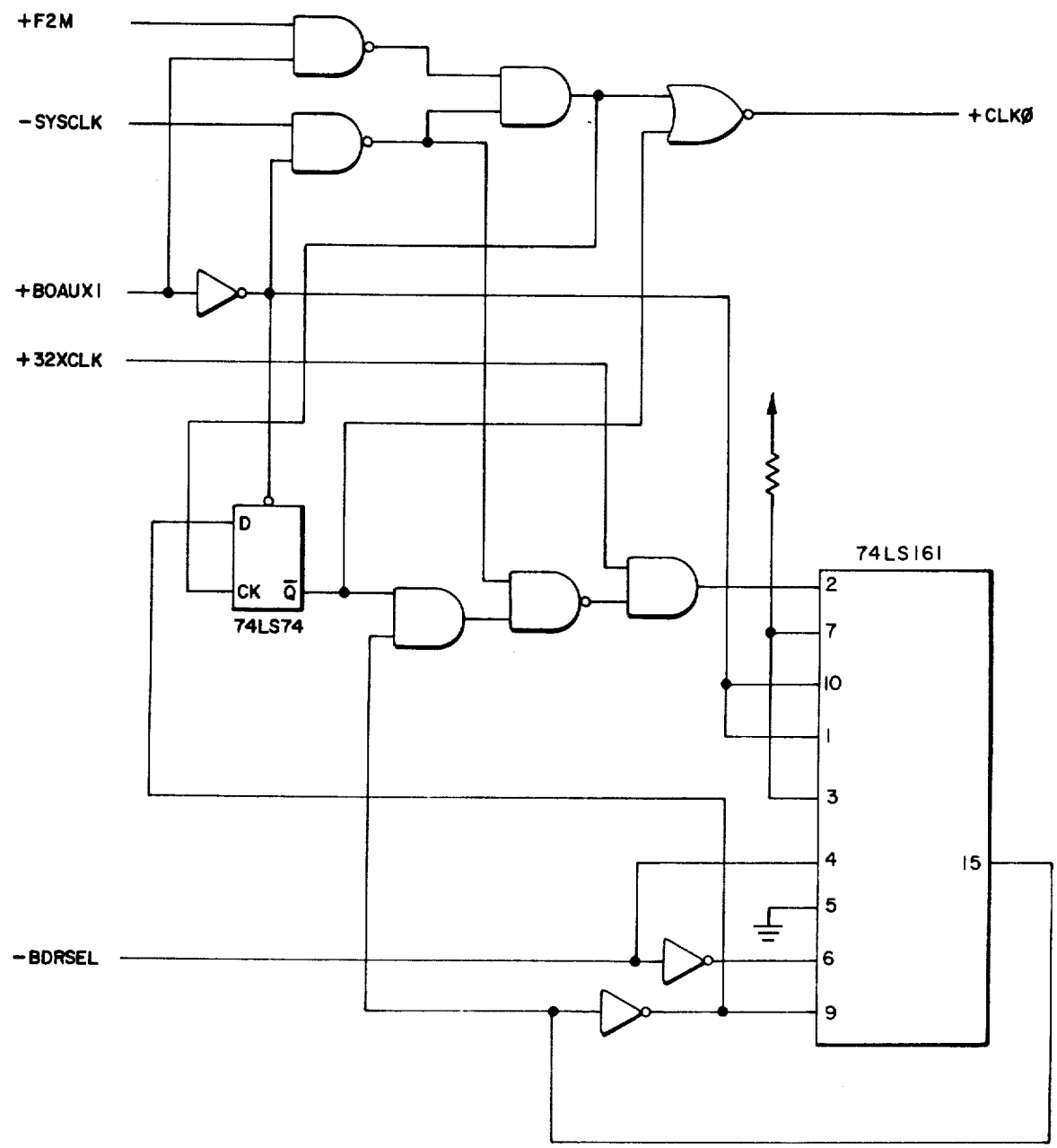
FIG. 17 is a schematic logic diagram of division circuitry which operates in conjunction with the timer circuit (8253) shown in FIG. 1.

FIG. 17 is a detailed logic diagram of circuitry which operates in conjunction with the timer circuit 18 to provide division of a clock signal by a fractional number.

The types and functions of the various logic circuits shown in FIGS. 2-16 are given in Table 1. In the FIGURES the initial "74" is omitted for the logic circuits.

TABLE 1

| PART NAME | DESCRIPTION |
|---|---|
| 74LS00 | Quad - Dual Input NAND |
| 74LS02 | Quad - Dual Input NOR |
| 74LS04 | Hex - Inverter |
| 74LS08 | Quad - Dual Input AND |
| 74LS11 | Tri - 3 Input AND |
| 74LS38 | Quad - Dual Input O.C. AND |
| 74LS74 | Dual - D-Type FF |
| 74LS86 | Quad - Dual Input XOR |
| 74LS138 | 3 to 8 Decoder |
| 74LS153 | Dual 4-1 Demultiplexor |
| 74LS157 | Quad 2-1 Demultiplexor |
| 74LS161 | Four Bit Binary Counter |
| 74LS174 | Hex - D-Type FF |
| 74LS245 | Octal Bus Transceiver |
| 74LS393 | Dual 4-Bit Binary Counter |
| 7432 | Quad - Dual Input OR |
| 75150 | Dual EIA Driver |
| 75154 | Quad - EIA Receive |
| 8251A | USART |
| 8253-5 | Prog. Timer |
| 8255A-5 | PPI |
| 8273 | HDLC/SDLC |

The operation of the multi-protocol communication adapter circuit which includes the present invention, is now described in reference to FIG. 1. To set up a communication path with a remote terminal the processor (not shown) transmits command signals through the processor I/O interface buses 12 and 14 to set up one of the desired communication protocols. The available protocols in this embodiment are asynchronous, bisynchronous and SDLC. These protocols are well defined in the communication industry. In the asynchronous protocol no clock signals are transferred between the control circuit and modem, but in the bisynchronous and SDLC protocols clock signals may or may not be provided between the control circuits and the modem. The control commands from the processor are sent to the timer circuit 18, PPI circuit 20, asynchronous and bisynchronous control circuit 22 and the SDLC circuit 24. The command sent to the timer circuit 18 and the PPI circuit 20 selects the clock rate that will govern the transmission of data through the communication path being established. The clock select circuit receives timing signals from the timer circuit 18, through the DPLL line 33 from the SDLC control circuit 24 or from a modem. The selected clock signals are then transmitted to the asynchronous and bisynchronous control circuit 22 and the SDLC control circuit 24. The processor transmits data to the one of the circuits 22 or 24 which is selected by the processor prior to the actual communication process.

After the adapter circuit 10 is initialized to operate in a selected protocol with a selected clock rate, data is transferred over the processor I/O interface bus 12 and a serial line in bus 44. Each of the circuits 22 and 24 has serial-to-parallel and parallel-to-serial data conversion. The data is transmitted on the data bus 12 in parallel format and the data is transmitted over a line in bus 44 in serial format.

The transition detection logic circuit 38 monitors the state of the control lines in bus 44 and detects state changes which require operative responses by the processor. These responses deal with the operational control of the data flow.

The wrap logic circuit 50 provides a test function by transferring data on the transmit part of bus 44 to the receive part of bus 44 for return to the circuits 22 and 24. This enables the control circuits 22 and 24 together with the processor to check the operation of the circuits by comparing the transmitted data to the received data. When the wrap logic circuit 50 is not in a test mode it provides a direct transmission path between the bus 44 and the bus 58 to the dual modem switch 56.

The SDLC control circuit 24 includes a digital phase locked loop (DPLL) which monitors the receive data stream from bus 44 and produces a phase locked data clock signal which is transmitted through line 33. This clock signal is input to the clock select circuit 32 and is utilized by the control circuit 22 when it is operating with the bisynchronous protocol.

The dual modem switch 56 selectively routes the data which is transmitted through bus 58 to either the EIA interface circuit 60 or to an internal modem connected to line 64.

The EIA interface circuit 60 coverts the TTL levels from bus 62 into the voltage levels defined by the EIA RS 232 interface standard.

The present invention comprises the feature of circuit 10 wherein the bisynchronous protocol is selected by the processor and the adapter circuit communicates through a non-clock-generating modem. For this situation the processor selects the asynchronous and bisynchronous control circuit 22 to work in the bisynchronous mode. The receive data from a modem is transmitted through bus 44 and input to the SDLC control circuit 24. Circuit 24 includes a digital phase locked loop which operates in conjunction with the clock signal received through line 26 to produce the data clock signal which is in phase synchronism with the receive data provided through bus 44 to circuit 24. This data clock signal is routed by the clock select circuit 32 to the asynchronous and bisynchronous control circuit 22. The data clock signal is then utilized in the bisynchronous protocol for processing the data between the processor and the remote terminal through circuit 22.

Thus, the bisynchronous protocol can be used with a non-clock-generating modem to expand the applicability of the bisynchronous protocol.

In summary the present invention comprises a bisynchronous protocol communication circuit for use in conjunction with a non-clock-generating modem to provide data transfer between a processor and a remote terminal. The necessary clock signal for bisynchronous operation is generated by a digital phase locked loop which receives a clock signal and the communicated data stream.

Although one embodiment of the invention has been illustrated in the accompanying drawings and described in the foregoing detailed description, it will be understood that the invention is not limited to the embodiment disclosed, but is capable of numerous rearrangements, modifications, and substitutions without departing from the scope of the invention.

I claim:

1. A bisynchronous protocol communication circuit for providing data transfer between a processor and a remote terminal under bisynchronous protocol, comprising:
    a non-clock-generating modem;
    means for generating a bit rate clock signal;
    a digital phase locked loop circuit connected to receive a serial data stream from said modem and connected to receive said bit rate clock signal from said generating means for generating a data clock signal phase locked with said serial data stream, and
    a bisynchronous communication control circuit connected for parallel data transfer with said processor, and connected to receive said serial data stream from said modem and said data clock signal, said bisynchronous communication control circuit for providing data transfer between said processor and said remote terminal through said modem under bisynchronous protocol.

2. The bisynchronous communication control circuit recited in claim 1 including a pulse stretching circuit connected to transfer said data clock signal from said digital phase locked loop to said bisynchronous communication control circuit.

3. A method for providing data transfer under a bisynchronous protocol between a processor and a remote terminal coupled to a non-clock-generating modem, comprising the steps of:
    generating a bit rate clock signal;
    transmitting said bit rate clock signal to a digital phase locked loop;
    transmitting a serial data stream from said modem to said digital phase locked loop;
    generating a data clock signal by said digital phase locked loop, said data clock signal phase locked to said serial data stream received from said modem;
    transmitting said data clock signal to a bisynchronous communication control circuit; and
    transferring data in a parallel format between said processor and said bisynchronous communication control circuit and in a serial format between said bisynchronous communication control circuit and said modem under said bisynchronous protocol by operation of said bisynchronous communication control circuit thereby providing data transfer between said processor and said remote terminal.

4. The method recited in claim 3 including the step of stretching the widths of the pulses of said data clock signal provided to said bisynchronous communication control circuit.

5. The bisynchronous communication control circuit recited in claim 2 wherein said pulse stretching circuit is responsive to command signals from said processor for setting the rate of data transfer between the processor and the remote terminal.

6. The method recited in claim 3 wherein the step of transmitting the data clock signal is accomplished in response to command signals received from said processor.

* * * * *